US010672564B2

(12) United States Patent
Rosener

(10) Patent No.: US 10,672,564 B2
(45) Date of Patent: Jun. 2, 2020

(54) ELECTRET ENERGY STORAGE SYSTEM

(71) Applicant: Kirk W. Rosener, San Antonio, TX (US)

(72) Inventor: Kirk W. Rosener, San Antonio, TX (US)

(*) Notice: Subject to any disclaimer, the term of this patent is extended or adjusted under 35 U.S.C. 154(b) by 20 days.

(21) Appl. No.: 16/139,084

(22) Filed: Sep. 23, 2018

(65) Prior Publication Data
US 2020/0098525 A1 Mar. 26, 2020

(51) Int. Cl.
*H01G 11/26* (2013.01)
*H01G 11/30* (2013.01)
*H01G 7/02* (2006.01)

(52) U.S. Cl.
CPC .......... *H01G 7/023* (2013.01); *H01G 11/26* (2013.01); *H01G 11/30* (2013.01); *H01G 7/02* (2013.01)

(58) Field of Classification Search
CPC ........ H01G 7/023; H01G 11/30; H01G 11/26; H01G 7/02
See application file for complete search history.

(56) References Cited

U.S. PATENT DOCUMENTS

| | | | |
|---|---|---|---|
| 3,644,605 A | 2/1972 | Sessler | |
| 3,873,930 A | 3/1975 | Winterberg | |
| 4,174,979 A | 11/1979 | Candor | |
| 4,288,584 A | 9/1981 | Mishra | |
| 4,626,263 A * | 12/1986 | Inoue | B01D 39/1623 307/400 |
| 5,128,540 A * | 7/1992 | Stieff | G01T 1/14 250/253 |
| 5,680,018 A * | 10/1997 | Yamada | H01S 3/0903 315/500 |
| 6,624,584 B2 * | 9/2003 | Schmidt-Boecking | H01J 3/04 250/423 F |
| 6,711,233 B2 * | 3/2004 | Hertz | H01J 35/08 378/119 |
| 6,873,086 B2 * | 3/2005 | Fujimura | H05B 41/30 310/318 |
| 7,033,406 B2 | 4/2006 | Weir | |
| 7,158,607 B2 * | 1/2007 | Dilmanian | A61N 5/1084 378/64 |
| 7,541,782 B2 | 6/2009 | Narendra | |
| 7,800,886 B2 | 9/2010 | Itahashi | |
| 8,611,067 B1 | 12/2013 | Pearson | |

(Continued)

OTHER PUBLICATIONS

Thomson, J.J., A Theory of the Connection between Cathode and Rontgen Rays, Philosophical Magazine, 1898, London, England.

(Continued)

*Primary Examiner* — Michael C Zarroli

(57) ABSTRACT

The Electret Energy Storage System (EESS) achieves an advancement in the energy storage field due to high energy/power level densities integrated into a long term energy storage solution. Combining the high density energy storage solution of the EESS with traditional battery storage technologies reduces the overall energy storage three dimensional footprint when compared to battery only footprints. This combined EESS/battery long term energy storage provides a solution in providing energy from renewable energy systems when the presence of the wind or sun are not available when compared to traditional battery only storage solutions.

18 Claims, 8 Drawing Sheets

(56) References Cited

U.S. PATENT DOCUMENTS

| | | | | |
|---|---|---|---|---|
| 8,699,666 | B2* | 4/2014 | Putterman | H05G 2/00 |
| | | | | 378/119 |
| 8,872,429 | B2* | 10/2014 | Rosener | H05H 1/48 |
| | | | | 315/111.81 |
| 9,129,748 | B2 | 9/2015 | Hucker | |
| 9,230,748 | B1 | 1/2016 | Semrau | |
| 9,293,269 | B2 | 3/2016 | Ehrenberg | |
| 2015/0061458 | A1* | 3/2015 | Kageyama | H01G 7/02 |
| | | | | 310/309 |
| 2017/0170752 | A1* | 6/2017 | Wei | H02N 11/002 |

OTHER PUBLICATIONS

Tesla, N, On the Source of Rontgen Rays and the Practical Construction and Safe Operation of Lenard Tubes, Electrical Review, 1897, New York, USA, pp. 67-71.

Breggen, Dissertation "The Pulse Response of Electrets to Energetic Ions", Air Force Institute of Technology, 1988, Dayton, OH, pp. 1-146.

\* cited by examiner

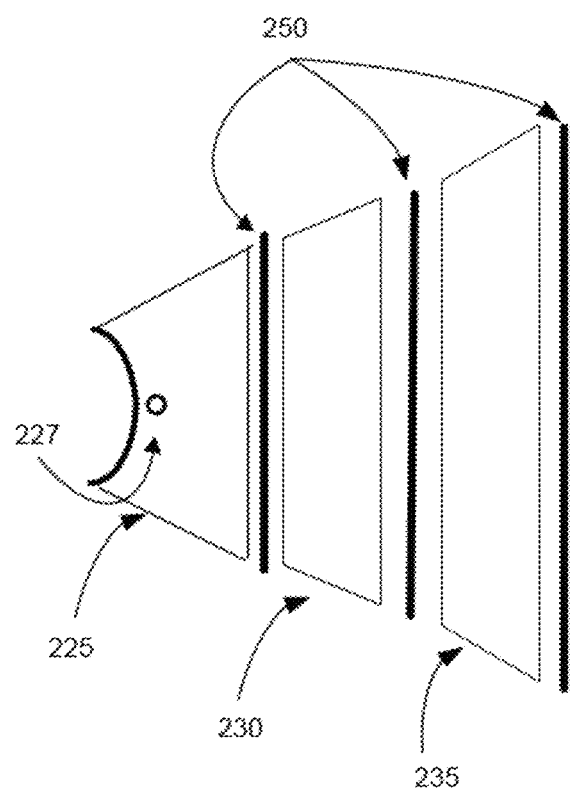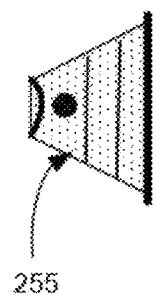

ELECTRET ENERGY STORAGE SYSTEM

BACKGROUND OF THE INVENTION

Field of Invention

The Electret Energy Storage System (EESS) achieves a significant advancement in the energy storage field due to high energy/power level densities integrated into a novel long term energy storage solution. Combining the high voltage solution of the EESS with traditional battery storage technologies significantly increases energy densities per unit area, thereby reducing the overall energy storage footprint. This combined EESS/battery long term energy storage provides a cost effective solution in providing energy from renewable energy systems when the presence of the wind or sun are not available when compared to traditional battery only storage solutions.

Components of the EESS storage approach provide a novel integration of key principles surrounding the capture and storage of extremely high voltage energies. Penetration of dipole oriented electrets, including high dielectric plastics, waxes, or crystals, by energetic bremsstrahlung photons occurs in the range of Kilovolts (KV) to megavolts (MV). Higher energy levels contained within the electric field of these energetic bremsstrahlung photons flow into the lower energy electric fields of each asymmetric energy storage cell as the bremsstrahlung photons traverse each cell. Energy transfer occurs as the higher energy bremsstrahlung photons traverse through the electret and are captured within lower energy levels of deep space charge capture capacities located within the electret material of the cell. The deep space charge high voltage energy storage capacities of each electret are formed within the internal volume of the electret material when it is initially created using novel techniques described within this specification.

These deep space charge electric field capture capacities are established during the initial poling process of electret or piezoelectric dielectric materials. Molecular dipole orientation, disassociated charged pair dipoles, multiple small spherulite formulations, and/or dense micro-crystalline structures are established from the intense electric fields occurring within each nascent EESS energy storage cell during the bremsstrahlung based poling process of the electret material. These internal structures capture and store portions of the energy from the energetic bremsstrahlung photon electric fields as they travel through the EESS electret based dielectric material. By design, the speed of each energetic bremsstrahlung photon as it traverses an asymmetric energy storage cell is calculated to be slow enough to provide sufficient time to remain near each established stationary deep space charge electric field to accomplish an effective transfer energy. This method allows energy transfer to occur from the higher energy bremsstrahlung photon electric field to the lower energy electric fields of established deep space charge electric field capacities as the photon passes near each stationary electric field. In contrast, the energetic bremsstrahlung photons are fired at sufficient velocity and energy levels to fully traverse the full depth of each asymmetric energy storage cell.

Energetic charged particles are used to create the energetic bremsstrahlung photons through a process similar to what has been described in a previously patented process by the Inventor (U.S. Pat. No. 8,872,429). The EESS process uses a charge point cell in creating energetic charged particles by performing a fast voltage rise time release of energetic electrons in creating energetic charged particles. The goal of this methodology is designed for the energetic charged particles to possess velocity, magnetic, and electric field components corresponding to the distance that each energetic bremsstrahlung photon needs to travel through a targeted asymmetric energy storage cell. The EESS process applies equations where the velocities of the energetic charged particles are proportional to the square root of the potential applied and the rate of the voltage pulse rise time as described by J. J. Thomson, G. W. C. Kaye, and Nicola Tesla in their experiments on Rontgen and cathode rays.

The energy storage within multiple electret cells comprising an energy storage reservoir are enclosed within a closed loop controlled environment incorporating sensing and measurement capabilities for optimizing pressure, magnetic field containment, humidity, and temperatures residing within the energy storage reservoir environment. This control methodology, combined with energy storage density electret containment characteristics, significantly reduces energy leakage over time from the energy storage reservoir spanning days, weeks, and months of time.

When a load is engaged, the EESS transforms the combined high voltage electric field energy stored within all asymmetric energy storage cell residing within the energy storage reservoir into conductive currents. This action occurs by withdrawing the stored energy through an integrated solution that includes traditional voltage step down and constant voltage sources, such as traditional batteries.

The high voltage energy maintained within the EESS energy storage electric charge density field reservoirs opens up new operational capabilities with respect to significant increases in energy and high power density per unit area. The goal of the EESS approach is providing a combined EESS/Traditional battery high density energy storage footprint that is comparable to fuel cell technologies than what can be obtained from traditional battery storage only lower density energy footprints.

One key advantage the EESS provides is a solution in overcoming the intermittency of wind and solar power delivery by integrating an EESS solution within traditional energy battery storage solutions by extending power delivery solutions of the combined system solution to days, weeks, or months. Additional advantages include increased energy storage life span of the battery subsystem through high energy EESS pulses reducing battery sulfation and a reduction in energy storage costs/watt per unit area in providing a source of fast conductive reactive, or reactive neutral, discharge currents with respect to utility power load response.

The storage of extremely high voltage energy occurs in electric charge density fields located within internal energy traps created within the manufacturing process of electrets (plastics and waxes). Examples of candidate electret materials include piezoelectric materials such as Rochelle salt crystals, barium titanate based ceramics, nonconductive plastic polymers, and aerogels. The key focus of the manufacturing process of these energy storage solutions is incorporating the capability to provide dense storage of extremely high voltage energy. These solutions provide advantages allowing the voltage squared function in Plank's energy storage formula (stored energy=½ $CV^2$) per unit area to occur within the EESS. This allows the EESS approach to compact stored energies into much smaller cubic sized footprints with significantly increased energy densities when compared to traditional energy storage technologies. In contrast to traditional storage technologies, the EESS stores energy in the KV to MV per cell range, whereas traditional battery designs are typically less than 5 volts/cell as well as traditional super capacitor voltage design ranges also being less than 5 volts.

The disbursement of the stored energy within the EESS occurs through a conversion of energy stored in the electric charge density fields of the electret storage reservoirs. The energy retained in these fields are transformed by the EESS into conductive currents flowing through conductors embedded within the EESS to external loads. Traditional voltage down conversion techniques are placed in series between the EESS and the associated battery subsystem, or directly to external loads, providing power quality conversion methods satisfying external load requirements.

Rapidly extracting energy from the electric fields of the electret storage reservoir of the EESS provides an additional benefit compared to rapidly extracting energy from a super capacitor. Energy extracted from a super capacitor flows through the dielectric material located between the conductive plates of the super capacitor. As the rate of energy extract is increased within a supercapacitor, there is a corresponding increase in the loss of energy through the increasing generation of heat as the higher rates of energy being extracted flow through the dielectric material of the super capacitor. The method of extracting energy directly from the electric fields residing within the electret storage reservoirs of the EESS avoids this issue experienced with super capacitors.

Key supporting components integrated within the novel EESS approach includes the placement of asymmetric shaped electret materials inside magnetic containment fields located within the energy storage reservoirs maintained under low vacuum pressures and low humidity. Energy is dispersed into each storage reservoir in the form of high voltages, ranging from KV to MV. These voltage levels are achieved by using energy sources (including renewable energy resources) creating energetic bremsstrahlung photons fired into the energy storage reservoir at extremely high voltages.

The EESS approach provides a significant reduction in the volume and physical footprint of each energy storage reservoir compared to the per unit area storage capacity of conventional batteries and capacitor cells limited to single digit voltage operational ranges. This increase in high energy density storage per unit area is due to the high voltage levels attained from the energetic bremsstrahlung photons dispersing energy into the lower lever electric fields residing within the electret material of the energy storage cells. As the high voltage levels are increased to levels in the KV or MV levels within the EESS storage reservoir, the energy and power levels per cubic unit area retained within the internal electret charge density fields are increased by the square of the voltage as reflected by Plank's equation (energy stored=$CV^2$) being significantly greater than typical 5 volt operational limitations of batteries and capacitors.

Prior Art

Prior art on storing and releasing energy using batteries or capacitors focus on using conductive plates as the primary method of both energy storage and providing conductive currents to external loads. Transfer of ions through a dielectric located between the plates is the common approach used in the prior art.

The prior art for traditional electret based storage concepts also reflects that energy storage at very low conductive current levels is the primary storage methodology. There are no descriptions in the prior art describing the primary storage of large volumes of energy within internal electric charge density fields of electrets. In addition there are no descriptions in the prior describing methods for extracting these electric charge density fields through conductive currents using techniques to directly transform the electric charge density fields into conductive currents.

In U.S. Pat. No. 9,129,748 Hucker, et. al. describes an electrostatic capacitor device using two electrodes constructed from composite materials containing embedded conductive fibers. The two electrodes are separated by a dielectric structure. The description of this device reflects energy storage capabilities similar to a capacitor rather than an electret. Energy is withdrawn from the conductive electrodes in the same manner that energy is extracted from capacitors, rather than extracting energy from the electrostatic fields residing internally within the dielectric material.

In Breggren's dissertation on "The Pulse Response of Electrets to Energetic Ions" (AFIT, 1988) the experimental results of dipole orientation and charge separation of disassociated charge pairs within the formation of thin film electrets is described. Alpha particle and fission fragment interactions provided from radiation sources were used in creating the dipole orientation and separation of the disassociated charged pairs. In his dissertation, Breggren describes observations from experimental results reflecting that the levels of dipole orientation and charge separation of disassociated charge pairs in forming electrets is limited to thin films only. Experimentation in attempting to form electrets using energetic ions at radiated alpha energy levels in thick films was described as not being successful. Nowhere in his dissertation does Bregrren describe attempts to use higher energy level bremsstrahlung photons to increase the quantity of deep traps/unit area within an electret to increase electrostatic energy storage levels. In addition Breggren does not describe any attempts of forming dipole orientation and charge separation of disassociated charge pairs within thick electret formations at energetic ion levels higher than levels provided by radiated alpha particles.

In U.S. Pat. No. 4,174,979. Candor describes a method of storing solar energy directly to a strip of electrets. The undisclosed implication is that the electret stores energy at the highest voltage provided by the solar energy cells which typically are in the single or low two digit voltage range. This approach does not include applying an intermediate method to increase the voltage levels received from the solar energy device to high voltage levels into the KV to MV range, thereby increasing the energy stored by the electret as described by Plank's equation (energy stored=$CV^2$).

In U.S. Pat. No. 3,644,905 Sessler describes an electron beam method where controlled secondary electron emission is a key component in manufacturing electrets having high capacity per unit volume energy retention characteristics that can be maintained over time. Key components of the electret manufacturing method described in this patent fall into a range of similar electret charging methodologies described as 'radio electrets' or 'foil electrets' in the art.

This patent describes a manufacturing process that does not require establishing an electric field in the thin film being charged, and does not require a particular temperature cycle. This patent also explicitly describes that it does not need to apply heating methods used in creating traditional thermo-electrets to create desired internal space charge polarization. In addition this patent states that the methods in creating radio electrets can only produce internal space charges and not aligned dipole polarization.

The methods used in creating electrets used within the EESS include sensing and controlling temperature cycling to form both internal space charges as well as molecular dipole alignment. The high energy density storage per unit area capabilities of the EESS energy storage process rely on this subset of capabilities being available within the overall storage process.

Additional methods used in creating electrets used within the EESS apply an integrated sensing, measurement, and controlling solution for of thermoelectric, energetic bremsstrahlung photons, pressure, humidity, and applying controlled temperature cycling times within energy each storage electret cell. The results of applying these methods forms multiple instances of crystallization, dipole pairs, disassociated charged pairs, and deep internal spherulite/dense micro-crystalline structures capabilities within the electret material of each cell. Results of applying these methods increases internal energy density/space charge capacities within each energy storage cell residing within the energy storage reservoir. This controlled and synergistic approach significantly increases the energy storage densities per unit area and provides lengthy energy storage times as compared to electrets produced using traditional thermoelectric or radio electret methods. The subsequent EESS energy storage process that takes place within the electret cells once they are placed into production continues to rely on this synergistic approach. Further, electrets formed by bremsstrahlung photons within the EESS are a result of energetic charged particles possessing higher density electric fields compared to traditional electron beam generation and radio electret poling techniques.

In U.S. Pat. No. 4,288,584, Mishra describes the preparation of electrets based on polymers such as polycarbonate and polyester. However, the initially high surface potential of electrets made from these polymers experiences a rapid reduction over time. This condition occurs especially when the humidity and temperature is high. Nowhere in this patent is a solution provided to inhibit the rate of reduction of the high surface voltage potential of electrets in the presence of high temperature or high humidity. Mishra is also silent on the use of either low or high pressure to increase the energy storage capacity per unit area of electrets, as well as the length of time to retain energy within storage reservoirs without significant losses of stored energy leakage.

In U.S. Pat. No. 8,611,067 Pearson and Feher describe an energy storage device based on the resonant transfer of energy into a dielectric matrix. The energy of this electric field is created by the voltage potential difference between two conductors. This energy is stored in a dielectric comprising an electret-containing matrix material and polaritonic nanoparticles.

The use of polaritonic nanoparticles limits the ability of the electrets to develop significant lengths of longitudinal electret molecular dipoles, as well as groups of disassociated charged pairs possessing higher electric field levels, based on extended distance separation during the initial poling process of the electret material. Extended length longitudinal electret dipoles and charged pairs established within the EESS during the electret poling process directly correlate to the increased size of the electric field allowed to capture and store energy within each EESS asymmetric energy storage cell.

The polaritonic nanopole method of storing energy is constrained by the coupling distance of the electric field energy into the dielectric/electret storage by the voltage differential between the capacitive plates, as well as the polaritonic nanopoles. Methods to significantly increase high energy density storage per unit area through high voltage pulsed discharges techniques is not described. In addition, a method to concentrate energy densities by shaping the energy storage reservoir to extract energy from electric fields rather than a direct connection flow of current is not described.

In U.S. Pat. No. 3,873,930 Winterberg describes a method of retaining very high electrostatic voltages on the metallic surfaces of a torrid in a manner similar to capacitor or battery methodologies. Unlike the method described by Winterberg that only uses a vacuum to slow down the rate of loss of energy from the conductive surfaces of the torrid, the EESS method employs a vacuum to perform two objectives.

The first primary objective in using a vacuum within the EESS apparatus is to allow higher velocities of energetic charged particles by increasing their mean free path towards striking a bremsstrahlung generation plate mounted on one vertex of each asymmetric energy storage cell. A second key objective of using a vacuum within the EESS apparatus is establishing a low pressure environment within the EESS energy storage reservoir. This method allows higher levels of electric field densities per unit area to occur within the spherulites, crystalline structures, and/or deep traps residing within each EESS asymmetric energy storage cell during the energy storage collection process. The EESS apparatus does not store energy on conductive plates as described in the Winterberg patent. The primary focus of incorporating focused magnetic fields into the EESS apparatus is performing as an additional component for increasing the energy density per unit area of energy storage, as well as reducing the rate of energy leakage from the storage reservoirs over time. A secondary object occurs by enhancing the extraction of energy from the internal electric fields stored within each asymmetric energy storage cell when focused magnetic fields are applied. The Winterberg method describes that the only use of magnetic fields is to lower the rate of energy loss from the conductive toroidal surface over time.

In U.S. Pat. No. 7,800,866 Itahashi, et. al. teach that the capacity of stored energy is defined by the formula $\frac{1}{2}CV^2$ (Wherein C is electrostatic capacity in Farads and V is voltage). The focus of this patent is on the enhancement of electrostatic capacitance per unit volume (C) to store more energy. Itahasu is silent on describing methods focusing on increasing the voltage (V) capability in taking advantage of the energy stored rising by the exponential value of 2 with each incremental increase in voltage levels.

The method described by Itahshu to achieve this increase in electrostatic capacity is the use of electric double-layer capacitors containing electrolytes of activated carbon to enhance electrostatic capacity per unit volume. While the use of activated carbon does increase levels of energy stored per unit area of a double layer capacitor, energy storage levels and retention times are significantly less than the EESS electret approach. In addition, once the energy differential applied across the conductive capacitive plates of the Itahashi device is removed the rate of energy loss from the Itahshu is significant when compared to the loss rates of energy from the EESS over time. In addition, the physical and electrochemical constraints of double layer super capacitors demonstrate their ability of not being able to take advantage of the $V^2$ opportunity in increasing energy capacity levels per unit area at voltage levels employed within the EESS methodology.

In U.S. Pat. No. 9,142,354 Chang describes a method of applying ferro-magnetic components to increase the dielectric strength of insulating materials separating two electrodes of a capacitor, as well as decreasing the leakage current and increasing the breakdown strength of the insulating layer. The methodology in this patent focuses on increasing the energy density on the conductive electrodes of the capacitor. In comparison, to the EESS, the primary objective is to increase the levels of electric field densities per unit area by enhancing the creation of spherulites, crystalline structures, dipole pairs, disassociated charged pairs, and/or deep traps residing within dielectric material contained in each EESS asymmetric energy storage cell. This EESS focus on dielectric structure effectively decreases the breakdown strength of the dielectric, rather than by increasing it using conventional capacitor design methodologies. This methodology also reflects the significant design differences between storing energy on conductive plates versus storing energy within electric fields residing within an electret. In addition, nowhere in this patent is a method descried in using magnetic fields to increase the length of energy storage time of the capacitor from minutes to days, weeks, or months.

In U.S. Pat. No. 7,541,782 Narendra and Borkar discuss an energy extraction system on supercapacitors that describes a wide range of methods for extracting energy from both capacitors and supercapacitors. Each of these methods are based on extracting energy from the positive and negative conductive plates of the capacitor or supercapacitor. This patent, as well as other patents in this field, that are based on extracting energy from a capacitor, are silent on extracting retained energy from the electric field residing within the capacitor. Patents in this field describe methods that only focus on extracting energy that is located on the conductive plates of the capacitor.

In U.S. Pat. No. 9,230,748, Semrau et al. describe an energy storage system incorporating combinations of batteries, ultra-capacitors and inductive components. This patent further discloses that energy is extracted from the energy storage system based on direct current extraction from the conductive elements of the system rather than directly from the energy stored within the electric fields of the electrical energy storage components.

In U.S. Pat. No. 7,033,406 Weir and Nelson describe an electrical energy storage unit using a high permittivity composition modified barium titanate ceramic powder as the insulator between two energy storing capacitor plates. Nowhere in this patent is the concept of energy storage discussed within the dielectric insulator located between the two energy storing capacitor plates.

In U.S. Pat. No. 9,293,269 Ehrenberg describes an energy storage device where energy is chemically stored within an ionic solid dielectric material bounded by two conductive plates. Ehrenberg teaches that a portion of the plurality of chemically bound positive ions must be ionically associated with a portion of the plurality of chemically bound negative ions. Nowhere in this patent is the concept of energy storage discussed to be occurring within electric charge density fields residing within the ionic solid dielectric material.

Discussion of Prior Art

A prior art review has not found the use the electric charge density field as the primary method of storing energy within the internal fields of electrets (plastic or crystal) or piezoelectric devices using energetic bremsstrahlung photons. Furthermore no solutions have been found in the art where the levels of energy storage density per unit area, combined with extended energy storage times described in this specification have been achieved.

With respect to forming electrets for energy storage, the prior art describes methods to store energy from the surface of thin film piezoelectric or electrets applying lower energy levels in the electret poling process that the levels used within EESS poling processes. The primary focus of the prior art in storing energy within batteries or capacitors focuses on storing energy on conductive plates separated by solid, liquid or gaseous dielectric materials.

Traditional battery or capacitor designs use conductive plates as the primary method of storing energy. This methodology imposes significant constraints on the chemical makeup of the dielectric selected limiting the amount of energy that can be stored within the electric charge density field of the dielectric materials used in these devices. In addition, energy storage densities per unit area are constrained by the combination of the size of the two dimensional surface area of the conductive plates and the dielectric breakdown constant of the dielectric material residing between the conductive plates of these devices.

When batteries are selected for energy storage the primary design focus is selecting dielectric material, liquid or gaseous characteristics to enhance the ion flow through electrolytes. The physics of the configuration of the dielectric material supporting ion flows between the conductive battery plates is not conducive to storing significant amounts of energy within electric charge density fields residing within the dielectric material of the battery itself.

Although the stored energy density of a typical chemical battery is quite high when compared to that of a typical capacitor, the voltage levels of each battery cell of a battery are limited to the single digit voltage range. The energy storage limitation of traditional battery cell technologies are overcome by integrating the voltage squared at KV and MV ranges of the EESS with traditional battery into a composite long term energy storage and power/energy delivery solution.

The functional lifetime of a traditional battery cell is limited due to irreversible chemical side reactions at the electrodes. In comparison, storing energy in electrets has demonstrated significant lengths of storage time (months to years) compared to the typical effective storage times of capacitors (hours) and batteries (days to weeks). Incorporating a composite EESS/battery solution provides an additional benefit by significantly extending the operational life of traditional battery cells. This benefit is derived through the incorporation of higher voltage electric fields into the battery recharging process of each lower voltage battery cell.

Recent advancements for increasing energy storage in batteries have focused on the use of solvent based electrolytes surrounding the conductive plates allowing the concentration of more energy per unit area into the battery itself. However, since these type of electrolytes are flammable there is an upper energy storage safety limit that cannot be passed on these types of batteries due to the increased risks of the battery catching on fire. This limitation is not imposed on traditional electret manufacturing solutions due to these types of flammable electrolytes not possessing desired dielectric material characteristics in forming electrets.

Historically energy stored in capacitors is primarily performed using one of three methods. The first method is to increase the surface area of the conductive electrodes to increase the volume of stored energy in the capacitor. The second method focuses on decreasing the distance between the electrodes. The third method focuses on increasing the dielectric constant of the dielectric layer to allow an increase in the voltage differential across the electrodes.

Traditional capacitor designs are based on the voltage in Plank's constant being more of a fixed component, typically much less than 5 volts. Therefore the primary option to increase energy storage levels with traditional capacitors is to increase electrode surface area as described for batteries above. Thus most capacitor and super capacitor cell designs are not able to take advantage of increasing the voltage levels to be stored within increasing thicknesses of the conductive capacitor plates due to the loss of desired capacitance values and low voltage level constraints.

The inherent capability of dielectrics used within capacitors to prevent electric breakdowns occurring between the plates of a capacitor are very inefficient with respect to storing energy within the electric charge density field of the capacitor dielectric. As described above, the method of capacitor and super capacitor designs focus on increasing the capacitance component of Plank's energy storage equation by minimizing the thickness of the dielectric between two conductive plates of a capacitor. In addition incorporation of higher voltage levels to take advantage of voltage squared capabilities to increase energy densities per unit area that can be achieved within electret dielectric formulations is not pursued due to traditional voltage breakdown design constraints.

Traditional capacitor and ultra-capacitors experience high levels of current leakage at high voltages due to the constraints imposed by the types of materials used in separating the plates of a capacitor. For the plates to be able to discharge current, a key design element focuses on the permittivity of the dielectric. One of the key differences in the dielectric of the types of electret material used within the EESS, as compared to the dielectric in a capacitor, is the electret dielectric characteristics of the EESS asymmetric energy storage cells are designed to have operational characteristics of high voltage, energy density capacity and low levels of current leakage.

From a power transfer perspective, capacitors and super-capacitors are limited due to high levels of Equivalent Series Resistance (ESR) imposed by traditional capacitor dielectric materials and their reliance on storing and extracting conductive energy on the conductive plates of the capacitor. In comparison, the EESS incorporates the advantages of a high ESR dielectric, combined with dielectric material characteristics allowing the interlocking of molecular dipoles, creation of disassociated charged pairs, and the establishment of internal electret charge density fields (space charges) at sufficient distances. The combination of these characteristics provide significant increases in electric charge high density field energy storage level capacities. This unique capability of the EESS methodology focuses on increasing energy storage densities by the square of the voltage as reflected by Plank's equation (energy stored=$CV^2$), rather being limited to primarily using methods to increase the capacitance within traditional electrical energy storage devices.

Another key difference between the dielectrics used within capacitors, versus in electrets, is the interaction of the electric charge density fields between dipoles once a capacitor is discharged. The dipoles residing within the dielectric material of capacitors typically will not remain aligned over short periods of time. A number of factors including thermal vibration will randomize their orientation with a corresponding reduction of energy residing within the internal electric charge density fields of the capacitors. Within EESS electrets, molecular dipoles remain aligned over long periods of time as the energy in the electric charge density field increases or decreases, thereby minimizing space charge decay over time. The net result of this capability contributes to the overall increase in energy storage times for the EESS.

With respect to self-discharge rates, a supercapacitor self-discharges its energy substantially faster than an electrochemical battery. In general, a supercapacitor will self-discharge at least half of its energy within several weeks of being charged. Lead and lithium-based batteries, in comparison, self-discharge at rates of approximately five percent per month. In comparison, and depending on the design, self-discharge rates of the EESS asymmetric energy storage cell electrets will be on the order of weeks to years before a five percent self-discharge rate occurs.

Objects and Advantages

One object of the invention is incorporating the EESS with traditional batteries into an integrated energy delivery solution. Most traditional energy consuming loads require a source of constant voltage. Combining the EESS (a constant current source) in parallel with a constant voltage source provides a synergistic solution in supplying energy to loads that significantly extends the operational life of the constant voltage source. A synergistic contribution of this approach also increases high energy density levels from the combined devices as well as increasing the operational life of the constant voltage source.

An additional object of the EESS is the ability is to significantly reduce the traditional time frame for externally recharging batteries that have been integrated into an EESS based solution. Energy transfer rates are significantly faster when they occur between a charged EESS reservoir and a second depleted EESS reservoir integrated with a traditional battery. This alternative advantage provides significantly faster system level energy recharge rates over time as compared to the traditional battery only recharge rates over time into the conductive plates of batteries.

An additional advantage of an EESS integrated energy delivery solution is lower weight per unit area. This advantage provides significant reductions in the combined EESS/battery high energy density storage/delivery footprint solution. This approach also provides rapid boosts of power supporting demand loads requiring high levels of power density per unit of time. This occurs through integrated EESS/battery solutions providing higher levels of effective energy capacities compared to traditional battery-only solutions.

Key advantages of the EESS at the system level are grouped into five areas. The cumulative contribution of sub-elements results in each advantage providing an energy storage device lasting from weeks to months supplying high rates of energy retention at low leakage levels. In addition the advantages of the EESS reduces the energy storage/watt footprint by orders of magnitude compared to traditional standalone battery and super capacitor energy storage technologies having equivalent energy storage capacities per unit area.

The unique characteristic of each of the following four advantages provides a synergistic contribution that is greater than the sum of the contributions from each key area as they are combined within the EESS architecture. An integrated EESS apparatus overcomes limitations of storing energy on conductive plates by taking advantage of storing energy within the electric fields residing within the electret storage areas by incorporating:

Key Advantage 1 maximizes the high energy density storage capacity per unit area in each electret energy storage reservoir cell by capturing and retaining electric field energy provided from high energy bremsstrahlung photons as move through each cell. These photons distribute energy within previously established high capacity electric field density capabilities residing within the dielectric material of each asymmetric energy storage cell.

Key Advantage 2 relies on increased energetic bremsstrahlung photon voltage levels, ranging from KV to MV ranges, as the electric fields residing within each electret energy storage cell absorbs and retains energy from bremsstrahlung photons traversing through the EESS. The increased voltage levels naturally occur as the wavelength of high speed electrons are decreased during the creation of energetic bremsstrahlung photons are fired into in each asymmetric energy storage cell.

Key Advantage 3 increases high energy density storage per unit area through the application and manipulation of focused magnetic fields, temperature, humidity, and low pressurization techniques using a closed loop monitoring and control mechanism. One component of this key advantage is that the combination of these techniques limits the rate of energy leakage per units of time across the energy storage reservoir assembly. An additional component of this key advantage is the facilitation of energy extraction rates from the electric fields of the EESS asymmetric energy storage cells in support of external load demands.

Key Advantage 4 significantly extends energy storage times with minimal reduction in energy storage levels using a combination of opposing electrostatic and magnetic field methodologies incorporated within an electret matrix. Elements of key advantage 3 discussed above are incorporated into this key advantage using active closed loop control monitoring and manipulation techniques.

Key Advantage 5 performs electrical current extraction by incorporating increased electric field flux densities at the energy extraction point of each asymmetric energy storage cell through electric field energy focusing techniques. These techniques use the advantages of asymmetric shaped manufacturing methods, capturing energy within the internal volume of the electret through molecular dipole orientation, disassociated pairs, multiple small spherulite formulations, and/or dense micro crystalline structures. Additional power extraction enhancements occur through aligning vacuum pressure levels to rise within the EESS as energy is extracted, providing additional enhancements to the energy extraction process.

The first key advantage in maximizing the EESS high energy density storage capacity per unit area of each asymmetric energy storage cell is accomplished through a tailored process involving the creation of deep space charges and ordered dipole groups as the electret material within the energy storage cell is formed. High energy electrons are fired through a low pressure gaseous environment into a bremsstrahlung charging plate. This action results in the creation of bremsstrahlung photons in the KV to MV range being driven throughout the dielectric material of each asymmetric shaped electret energy storage reservoir cell during the poling portion of thermoelectret manufacturing or crystal electret growing processes.

During the thermoelectret poling formulation process for plastics, energetic bremsstrahlung photons are fired into the dielectric material of each storage cell at energy levels allowing the creation of aligned dipole groups and disassociated charged pairs. These aligned dipole groups and disassociated pairs are distributed throughout the dielectric material residing between the charging plate and a second plate having an opposing charge residing on the opposite side of the storage cell. The key advantage of this approach is that the higher energy levels of the energetic bremsstrahlung photons providing significantly deeper penetration into the electret as it is formed. This method allows a much thicker electret to be created thereby allowing a significantly greater volume of energy to be stored in each cell, than thin electret cells formed using traditional thermoelectret or radio-electret processes historically described in the art.

Initial electric field levels established across the electret at the beginning of the thermoelectret formulation process for plastics continues to be maintained during the cooling phase of the electret formulation process. This method allows the energetic bremsstrahlung photons to continue flooding through the deep spaces of the dielectric in each storage in maintaining energy at sufficient levels to retain previously established dipole alignments, disassociated pair separation, spherulite formulations, and/or dense micro crystalline structures. Additional methods used to maintain desired alignments and separations includes synchronized pressure and magnetic field changes during this portion of the asymmetric energy storage cell formulation process.

The increase in distance between dipole groups in the form of disassociated charged pair separation expands as the energy of the charged dipole groups is increased was reported by Berggren with respect to disassociated charge pairs. Berggren also reported that as energies are increased, the number of charge carrier pairs within the electret is also increased. The advantage of the EESS method in creating high energy storage electrets over the Berggren process is the use of energetic bremsstrahlung photons. The energy density per unit area electret storage capacity established as described in the Berggren process is severely limited by the significantly lower voltage rise times and energy levels of the alpha particles used in his experiments. The EESS process of using bremsstrahlung photons providing much higher voltages, voltage rise times and energy levels overcomes the limitations of applying alpha particles as described in the Berggren process.

An additional advantage of the EESS process to increase energies in creating charge carrier pairs is the method used to increase bremsstrahlung photon velocities propelled into the EESS electret material in the thermoelectret manufacturing. Each increase in voltage levels used in creating bremsstrahlung photon velocities is proportional to the square root of the applied potential as reported by Kaye. In addition Kaye teaches that when energetic charged particles are sent through a thin metal plate the volume of energetic bremsstrahlung photons emerging from the plate into the electret is increased. Therefore, the EESS method provides the advantage of faster and more energetic rays driving higher energy bremsstrahlung photons much deeper into thicker electret materials compared to what has previously been disclosed in the art.

Voltage level potentials of the energetic bremsstrahlung photons are increased as a result of the energetic charged particles leaving the charge point cell striking the conductive plate located at the front of each EESS electret cell. Voltage levels of the resulting bremsstrahlung photons emitted into EESS electret cell storage reservoir are increased due to the wavelength of the emitted photon being decreased during the creation process of each bremsstrahlung photon. The reduction in wavelength increases bremsstrahlung voltage levels due to the inverse relationship of wavelength to voltage as described in Plank's equation (Potential Energy $(E)=hc/\lambda$). The EESS uses this advantage of increasing voltage levels through the reduction of energetic bremsstrahlung photon wavelength to increase the energy density storage capacity ($E=\frac{1}{2}CV^2$) capability per unit area of each energy storage cell.

Increasing the number of charge carrier pairs created in the thermoelectret generation process directly correlates to the total energy storage capacity of each EESS storage reservoir cell. A companion goal is increasing the distance separation between charge carrier pairs allowing higher levels of electric field flux capacity to be achieved in each EESS storage reservoir cell. An additional companion goal is increasing the number of charge carrier pairs through larger volumes of the EESS storage cell by taking advantage of the increased depth of penetration of energetic ions into thick electrets provided through the use of energetic bremsstrahlung photons.

When creating asymmetric energy storage cells in processes used to grow crystalline electrets, methods similar to what is described above are used for creating increased electric field flux densities residing within deep internal space charge environments of these crystals. The novel methods applied within the EESS crystal electret manufacturing process are combined with well-established crystal growing techniques described in patents authored by Nicolson and patents assigned to the Brush Development Company. The end result of applying electric fields and pulsed energetic bremsstrahlung photons into the crystals as they grow contributes to increasing electric field density values per unit area within the manufactured crystals by enhancing the development of internal dense micro-crystalline structures.

The second key advantage of the EESS apparatus is the method of replenishing the energy within the EESS energy storage reservoirs as they are depleted in providing energy to desired loads. This method uses high voltages inputs exceeding 100 KV received from the bremsstrahlung charging points to drive energetic charged particles into the EESS energy storage electret cells. This method applies a modified subset of techniques described in the Inventor's Pulsed Plasma Generator (PPG) patent (U.S. Pat. No. 8,872,429).

Energy transfer into each electret energy storage cell is performed using pulsed electrostatic brush discharge techniques in creating high energy bremsstrahlung photons. This done by driving high voltage electrons into the tip of polygonal shaped charge point cells located just outside of each EESS electret cell. The resulting pulses of energetic charged particles leaving the tip of the charge point cells, each striking a bremsstrahlung charge plate embedded in the vertex of each EESS electret cell. These energetic charged particle in turn generate energetic bremsstrahlung photons flooding into the electret material of the targeted EESS electret cell.

As the energetic charged particles strike a bremsstrahlung charge plate the wavelength of the photon leaving the plate into the electret dielectric is decreased. A corresponding increase of the voltage levels within the electric field of each energetic bremsstrahlung photon occurs as described by the Plank and de Broglie equations, due to the inverse relationship between the voltage and wavelengths of the energetic bremsstrahlung photon.

As each bremsstrahlung photon flows into an EESS electret energy cell, the electric flux density within each EESS electret energy storage cell is increased as the energy of the electric flux density rises from receiving energy from the higher energy levels of the incoming bremsstrahlung photons. This energy distribution occurs by the distribution of energy from each bremsstrahlung photon's higher energy electric field levels flowing into the lower level energies of the interlocking electric flux field lines residing throughout each electret energy storage cell. The asymmetric wedge shape design of each reservoir storage cell residing within an EESS energy storage reservoir contributes to absorbing the higher levels of energy from the energetic bremsstrahlung photons by providing a broader area of interlocking lower energy electric flux fields.

As the energetic bremsstrahlung photons flow through the electret material of the asymmetric wedge shape of the EESS electret storage cell, energy levels of the electric fields between each charge carrier pair that has been depleted in a previous energy discharge process discussed below are replenished. In general, the electric field energy retained from each carrier cell will increase to similar levels throughout the asymmetric wedge shape of each EESS electret storage cell. The energy storage replenishment process fills up from lower and broader energy collection area of the asymmetric wedge shape of the EESS electret storage cell first. It then progresses to the smaller area of the upper portion of the asymmetric wedge shape of the EESS electret storage cell. This process is due to the larger quantity of charge carriers located in the lower and broader area of the asymmetric wedge shape of the cells as compared to the smaller area near the tip of the asymmetric wedge shape of the cells. Once the total energy levels located at the narrower top of the asymmetric wedge shape reach similar energy levels presented by the bremsstrahlung photon creation process, the EESS electret storage cell is ready for the next cycle of the energy dispersement process.

The most significant component of the EESS approach with respect to increasing energy storage capacity per unit area, is taking advantage of the squaring of operating voltages ranging from KV to MV levels in the energy storage formula $E=\frac{1}{2}CV^2$. Tailoring of the EESS to desired external load demands is performed through modular expansion of additional asymmetric energy storage cells within an EESS reservoir. The quantity of additional cells needed is based on the formula of Total Energy Stored=$(\kappa\varepsilon_0 V^2/2) \times$ (Ad)$\times$number of EESS storage cells, where (Ad) represents the volume of the energy storage cell in area and depth, and KCo represents the contribution from the dielectric constant value of the energy storage material. The overall high capacity energy storage of the EESS is determined by the number of asymmetric energy storage cells incorporated into a storage reservoir.

A third key advantage of the EESS apparatus is increasing high energy density storage per unit area through the application of focused magnetic fields, humidity/temperature modification, and low/high pressurization techniques using conventional closed loop sensing, measurement, control and monitoring methodologies. The application of these methods within the EESS process contributes to limiting rates of energy leakage per units of time across the energy storage reservoir during the time period that energy storage levels are increased in the EESS, and during long term energy storage periods. The goal of these methods is to contain the movement of free electrons within the EESS storage reservoir while minimizing the rate of free electrons exiting from EESS energy storage boundaries over desired energy storage retention time frames. This capability is performed through the combined application of magnetic fields distributed throughout internal paramagnetic shielding, lowering temperatures/humidity levels and applying low pressurization techniques in combination with the inherent energy retention characteristics of the EESS electret materials.

One method of this third key advantage extracts portions of the high voltage energy stored in the EESS energy storage reservoir sending a high voltage current through electromagnetic coils. The second method strategically places the electromagnetic coils within paramagnetic materials surrounding each EESS electret storage cell, as well as areas located within the outside wall that encloses the entire EESS storage apparatus. A voltage down conversion process increases current levels flowing through electromagnetic coils generating a magnetic field. The energy of this magnetic field is dispersed throughout the paramagnetic material surrounding each asymmetric wedge shaped EESS electret storage cell creating a magnetic flux envelope surrounding each electret storage cell.

The EESS approach provided through key advantage 4 results in the EESS solution having extended periods of energy storage at high levels of energy retention. The extended period of energy storage time, ranging from days to weeks with low energy leakage levels, occurs through a combination of opposing negative electric field energies surrounding the EESS asymmetric energy storage cell. The opposing electric field energies are provided through a separate set of asymmetric shaped electret crystals possessing negative electric field energies greater than the energy of individual electrons attempting to escape each asymmetric energy storage cell. Voltage levels monitored at the apex of the asymmetric shaped electret crystals are fed into the closed loop control methodology discussed as part of key advantage 3 above. The asymmetric shaped electret crystals are embedded within an additional electret based filler surrounding each EESS asymmetric energy storage cell. This electret based filler is in turn surrounded by a paramagnetic shell used to propagate a magnetic field contributing to EESS energy retention characteristics over time.

The focus of applying low pressure is the enhancement for withdrawing energy from EESS apparatus during the fifth key advantage of the EESS during the energy extraction phase. Low pressure, as well as the methods described above, collectively increase the electric flux density intensities associated with the stored energy at the energy extraction point within the EESS. These methods, including the wedge shape design of each energy storage cell, apply electric field focusing techniques at the point of conductive current extraction within the EESS. From an integrated system perspective, the EESS design increases electrostatic field intensities to levels allowing conductive currents to flow out of EESS electret cells in the reservoir to satisfy external power load demands.

Larger volumes of dipole pairs and disassociated charge pair dipole groups are located within the broader portions of the cell's asymmetric wedge shape. An advantage of this method provides an increase in the concentration of electric field flux density levels at the apex of each EESS electret energy storage cell. This advantage in turn enhances the ability for conversion of electric charge densities residing in the flux of the EESS electret electric fields into conductive currents at the point of energy extraction located within the apex of each EESS electret energy storage cell. The concentration of electric flux density levels occurs because of the reduced volume of electret material residing in the apex of the asymmetric wedge shape of each cell. This increased concentration of energy is due to the overall electric field strength of the wedge being the same across the overall internal area of the asymmetric energy storage cell.

Processes for extracting energy from the EESS reservoirs to power external loads include heated cathode and transformer down conversion techniques commonly used by engineering practitioners in high voltage industries.

SUMMARY

The unique combination of the EESS innovative apparatus advantages provides an innovative method of energy storage, ranging from kilowatts to megawatts, that is scaled to meet external energy load demands at traditional voltage and current levels. Innovative EESS advantages include high energy density storage capacity per unit area in KV to MV ranges using energetic bremsstrahlung photons; extended energy storage times ranging from days to months through integrated energy retention solutions incorporating electrets residing within closed loop controlled magnetic fields, temperature, humidity and vacuum pressures; novel energy extraction techniques using an asymmetric energy storage design incorporating high charge densities residing within EESS electret electric fields supplying conductive currents. The synergistic combination of the EESS apparatus elements allows energy storage reservoir capacities to be expanded to provide energy through constant voltage sources supporting traditional load demands.

BRIEF DESCRIPTION OF THE DRAWINGS

FIG. 9D—Includes and embodiment depicting the positioning of three asymmetric wedges comprising an asymmetric energy storage cell in the assembly process.

FIG. 9E—Includes and embodiment depicting the final assembly state of an asymmetric energy storage cell.

---

DRAWINGS - LIST OF REFERENCE NUMERALS

---

10 - Energy Storage Reservoir
15 - Paramagnetic Material
20 - Paired Helmholtz Coils
23 - Asymmetric Energy Storage Cell
25 - Electret Cell Containment
30 - Charge Point Cells
35 - Charge Tube
40 - Positive Conductive Terminal
45 - Bremsstrahlung Charge Tube
50 - Conductive Current Cable
53 - Vacuum Discharge Port
55 - Energy Extraction Points
60 - Voltage Charge Input
75 - Asymmetric Energy Storage Cell
80 - Bremsstrahlung Charge Plate
85 - Positive Conductive Terminal/Ground
90 - Conductive Current Cable
95 - Electret Material
97 - Asymmetric Energy Storage Cell
100 - Conductive Terminal/Ground Plate
103 - Battery
104 - Ground
105 - Conductive Current Cable Housing
110 - Bremsstrahlung Charge Tube
115 - Charge Point Cells
120 - Charge Tube
125 - Energetic charged particles
130 - Charge Point Cell
135 - Charge Tube
138 - Conductor
140 - Energy Storage Reservoir
145 - Paramagnetic Material
147 - Asymmetric Shaped Electret Crystal
150 - Electret Based Dielectric Material
155 - Asymmetric Energy Storage Cell
157 - Bremsstrahlung Charge Tube
160 - Charge Tube
165 - Paired Helmholtz Coil
175 - Helmholtz Coil Input
185 - Energy input - EESS Storage Reservoirs
190 - Heated Filament (Cathode)
195 - Plate (Anode)
200 - Battery
205 - External Load
206 - Asymmetric Energy Storage Cell
207 - Charge Point Cell
208 - Bremsstrahlung Charge Plate
210 - Dipole Groups
211 - Conductive Terminal
212 - Battery
215 - Disassociated Charged Pairs
218 - Electric Flux Fields
220 - Charge Plate
221 - Charging Wire
222 - Charge Point Cells
224 - Bremsstrahlung Charge Plate
225 - $1^{st}$ Asymmetric Wedge
227 - Cable Housing
230 - $2^{nd}$ Asymmetric Wedge
235 - $3^{rd}$ Asymmetric Wedge
240 - Photon Receiving Plate
245 - Battery
250 - Conductive Mesh Screen
255 - Asymmetric Energy Storage Cell
280 - Electromagnet
285 - Paramagnetic Material
290 - Magnetic Field Flux Lines

---

DETAILED DESCRIPTION—FIG. 1 THROUGH FIG. 10—PREFERRED EMBODIMENT

The preferred embodiment of the EESS invention performs as an energy storage device ranging from kilowatts to megawatts at increased energy densities per unit area. The EESS energy storage density per unit area footprint is significantly less than traditional energy storage technologies that have previously been reported within the energy storage art. Expected energy retention times range from days to months at low levels of energy leakage.

Figure 1:
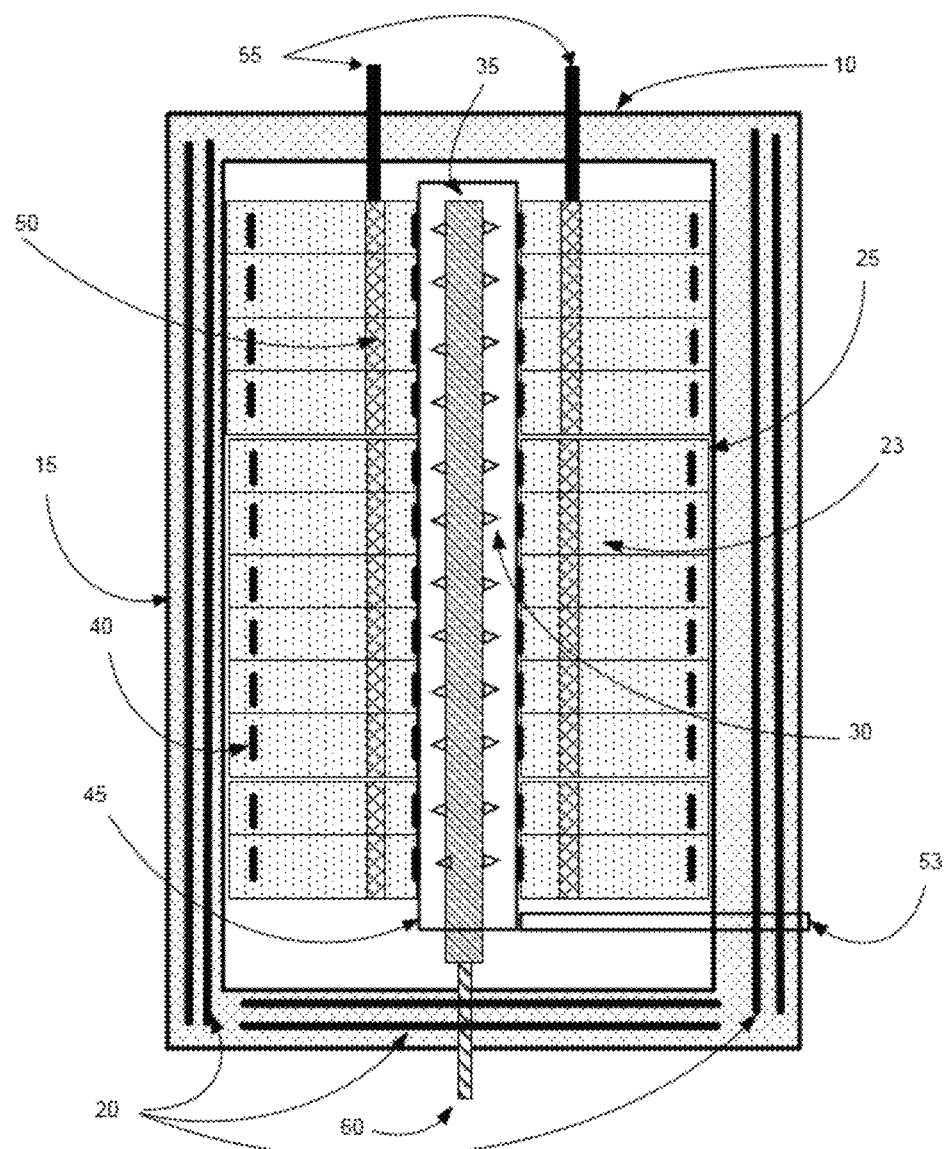
FIG. 1—Includes one embodiment of an Assembled view of EESS Apparatus showing the inclusion of the asymmetric energy storage cells, and charge point cells connected to the charge tube residing within a paramagnetic material.

The energy storage reservoir (10) depicted in FIG. 1 completely encases all electret energy storage reservoir cells (23) that are encapsulated by the EESS paramagnetic material (15). During the charging period of each electret energy storage reservoir cell (23), a vacuum is maintained with the bremsstrahlung charge tube (45). The charge point cells (30), attached to the charge tube (35) fire energetic charged particles into the bremsstrahlung charge tube (45) connected to the front end of each electret energy storage reservoir cell (23). Energetic bremsstrahlung photons exiting from the charge tube (45) flow into each electret energy storage reservoir cell (23) towards the positive conductive terminal (40) located at the rear of each cell. External energy supplied from renewable energy sources such as solar or wind is provided to the charge tube (35) from a voltage charge connection input (60).

Paramagnetic materials (15) shown in FIG. 1 propagate a magnetic field throughout the energy storage reservoir (10) provided from a series of opposing paired Helmholtz coils (20) encapsulated within the paramagnetic materials (15). The combination of the magnetic field propagated throughout the EESS storage reservoir (10) through the paramagnetic material (15); the application of low pressure techniques incorporated through the use of the vacuum discharge port (53); and the inherent energy retention capabilities of the electret material used in the manufacture of the electret asymmetric energy storage reservoir cells (23) combine to retain the collected energy residing within the energy storage reservoir (10) over extended periods of time.

The inclusion of a vacuum within the energy storage reservoir (10) contributes two additional benefits within the EESS energy storage retention over time methodology. The first benefit of introducing a vacuum within the energy storage reservoir (10) is that the vacuum raises the energy barrier limiting free electrons attempting to exit the EESS energy storage reservoir from the electret storage material. The second benefit is the presence of a vacuum increases the dielectric constant values of the dielectric materials residing within the EESS storage reservoir (10). Each decrement of the vacuum pressure introduced into the EESS storage reservoir (10) corresponds to an increase in the dielectric strength of the dielectric materials reservoir.

Output of energy from the electret energy storage reservoir cells (23) is performed through the perforated outer conductor of a conductive current cable (50). Conductive currents flow through energy extraction points (55) by drawing energy from high voltage electric charge density electric flux fields permeating the conductive current cable (50) within each electret energy storage reservoir cell (23).

The concentration of the electric charge density field lines permeating the perforated outer conductor is enhanced by connecting the center conductor of the conductive current cable (50) to the positive pole of a battery (not shown) during energy discharge periods. This method increases the energy extraction rate per unit of time of electric currents. This energy extraction from electric high charge density fields to conductive currents occurs through the EESS methodology enhancing higher concentrations of electric flux charge density field lines to bisect the perforated outer conductor of the conductive current cable (50).

Figure 2:
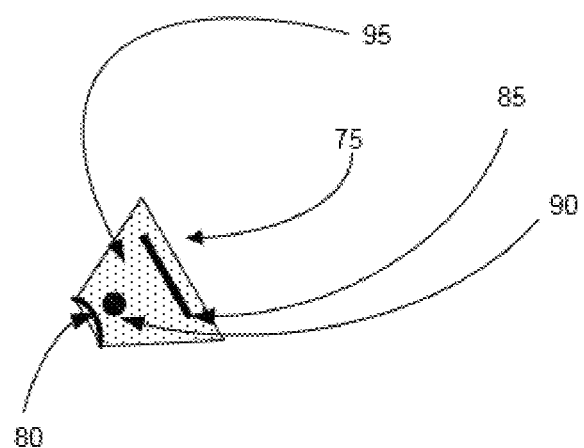
FIG. 2—Includes one embodiment of an assembled Asymmetric Energy Storage Cell showing the inclusion of a bremsstrahlung charge plate, a portion of a conductive current cable and a conductive terminal encased within an electret material.

FIG. 2 provides a depiction of an EESS asymmetric shaped energy storage cell (75). When struck by energetic charged particles (see the discussion on FIG. 3 below), energetic bremsstrahlung photons exit from the bremsstrahlung charge tube (80) and travel through the electret material (95) towards the positively charged conductive terminal (85). The higher energy levels of the energetic bremsstrahlung photons disperse portions of their energy from their higher level electric fields into the lower energy levels of electric flux densities of the dielectric material (95). A larger capacity of electric flux density per unit area occurs within the broader area of the asymmetric shaped energy storage cell (75) because of the larger volume of physical dielectric area allowing a greater number of electric flux lines to occur. The energetic bremsstrahlung photons establish an energy gradient between higher and lower electric flux density areas as they flow through the asymmetric shaped energy storage cell (75). This energy gradient further enhances the flow of energetic bremsstrahlung photons from the front of the asymmetric shaped energy storage cell (75) to the broader areas of the cell located at the rear of the asymmetric wedge shape of the cell. This natural flow of photons allows the higher energy levels of each bremsstrahlung photon electric field to be disbursed across a broader quantity of electric flux lines located within the asymmetric shaped energy storage cell (75). The combination of these two factors provides a method where electric flux energy per unit area perspective is concentrated in the narrower/smaller portion of the asymmetric wedge shape of the EESS storage cell while the overall electric field values per unit area remain the same across the asymmetric energy storage cell (75).

Energy is withdrawn from the asymmetric shaped storage cell (75) through the outer conductor of the conductive current cable (90) positioned within the higher electric flux density per unit area in the small portion of the wedge shape of the storage cell (75). The outer conductive portion of the conductive current cable (90) is energized to the same voltage levels as the magnified stored electric flux charge densities permeating the outer shield of the conductive current cable (90). The energy stored within the charge densities of the electric flux permeating the outer conductive portion of the conductive current cable is attracted to the positively charged inner conductor of the conductive current cable (90). The energy residing within the electric flux lines is transformed into conductive currents flowing through the outer conductor of the conductive current cable (90) to the energy extraction point satisfying external load demands. This extraction process is described in more detail through the discussion on further described in FIG. 7 below.

Figure 3:
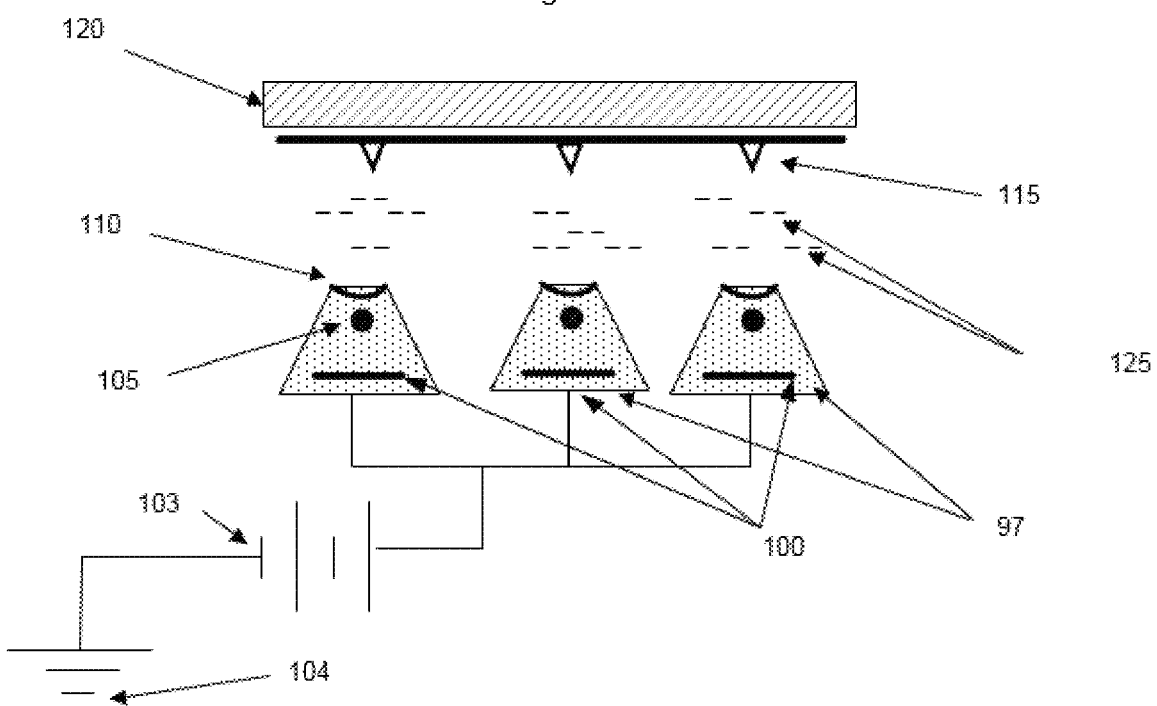
FIG. 3—Includes one embodiment of an Asymmetric Energy Storage Cell Charge View depicting charge point cells projecting energetic charged particles moving towards asymmetric energy storage cells.

FIG. 3 depicts the flow of energetic charged particles (125) from the charge point cells (115) towards the inside surface of the bremsstrahlung charge tube (110) mounted on the front end of each asymmetric energy storage cell (97). As the energetic charged particles (125) strike the inner portion of the bremsstrahlung charge tube (110) a portion of their energy is expelled from the outer side of the tube as energetic bremsstrahlung photons propagate through the electret material of the asymmetric energy storage cell (97) towards a conductive terminal/ground plate (100). The positive charge on the positive conductive terminal/ground plate (100) provides an attraction point for the negatively charged energetic bremsstrahlung photons and is maintained through a connection to the positive pole of a battery (103). The negative side of the battery (103) is in turn connected to a ground terminal (104). The charge point cells (115) are physically mounted to a charge tube (120) which provides stepped up voltage energy from external renewable energy power sources, such as wind or solar. The energy residing on the charge tube (120) flows to tip of the charge point cells (115), described in further detail in FIG. 4. Energetic charged particles (125) are released from the tip of the charge point cells (115) and are driven into the inner wall of the bremsstrahlung chare tube (110). Energetic bremsstrahlung photons exiting the bremsstrahlung charge tube (110) into the asymmetric energy storage cell (97) flow past the conductive current cable housing (105) towards the conductive terminal/ground plate (100)

Figure 4:
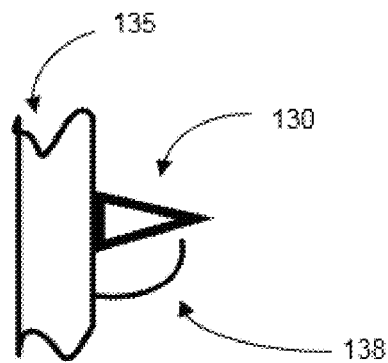
FIG. 4—Includes one embodiment of Bremsstrahlung Charge View depicting a charge point cell mounted onto a charge tube and an attached conductor.

FIG. 4 provides a depiction of the structure used to create the energetic bremsstrahlung photons that charge each asymmetric energy storage cell (97) depicted in FIG. 3. Returning to FIG. 4, the charge point cell (130), attached to the charge tube (135) is charged by the conductor (138) as it draws high voltage energy supplied from the charge tube (135). The energy supplied to the energy charge tube (135) is provided from renewable energy sources at stepped up voltage levels sufficient to create a brush or corona discharge at the tip of the conductor (138) directed towards the tip of the charge point cell (130). The high voltage energy from the brush or corona discharge is dispersed throughout the entire volume of the charge point cell (130). Energy levels within the cell rise until the energy at the tip of the charge point cell (130) reach a level allowing the creation of energetic charged particles that are fired towards the inner wall of the bremsstrahlung charge tube (110) depicted in FIG. 3. Energetic bremsstrahlung photons (not shown) are then projected from the outer wall of the bremsstrahlung charge tube (110) into the dielectric material of the asymmetric energy storage cells (97) depicted in FIG. 3. Additional detail of how energy from the electric field of the energetic bremsstrahlung photons is captured and distributed throughout the asymmetric energy storage cells (97) depicted in FIG. 3. is provided in the discussion on FIG. 8 below.

Figure 5:
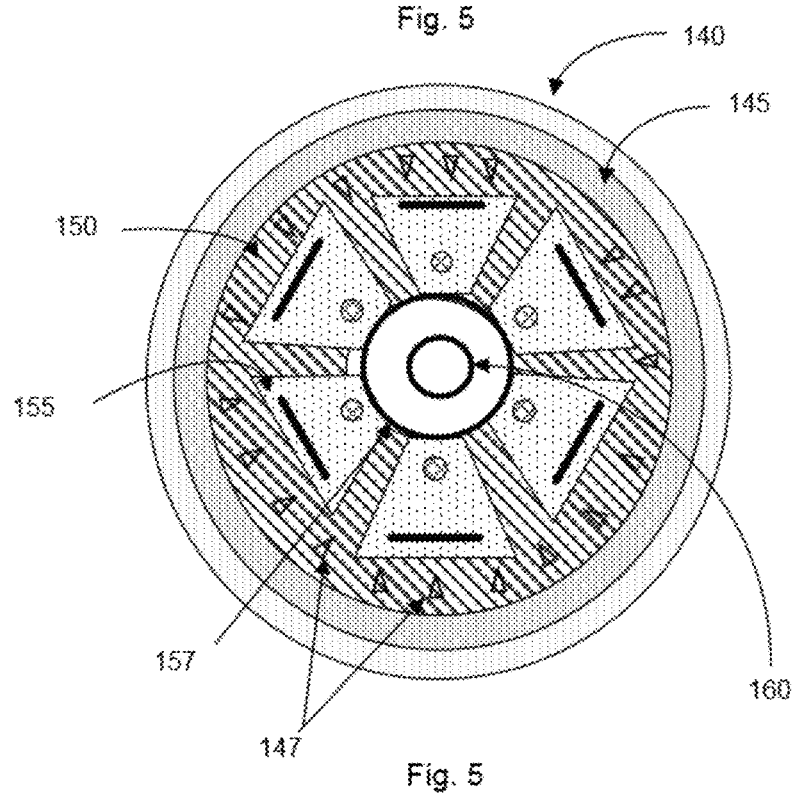
FIG. 5—Includes one embodiment of a Top Down View of the EESS Apparatus depicting the energy storage reservoir of the EESS Apparatus depicting a layer of paramagnetic material encapsulating an electret based dielectric material surrounding the asymmetric energy storage cells and the bremsstrahlung charge tube.

FIG. 5 provides a top down view of the energy storage reservoir (140). The bremsstrahlung charge tube (157) is surrounded by asymmetric energy storage cells (155) that are also stacked on top of each other as depicted in FIG. 1. The charge tube (160) inserted inside the bremsstrahlung charge tube (157) carries the mounted charge point cells (not shown) discussed in FIG. 3. and FIG. 4. The asymmetric energy storage cells (155) are embedded within an electret based dielectric material (150) that is surrounded by a layer of paramagnetic material (145). Asymmetric shaped electret crystals (147) are embedded within the electret based dielectric material (150) with their highest electric field capacity apexes pointed toward their corresponding asymmetric energy storage cells (155). The layer of paramagnetic material (145) distributes a magnetic field discussed in FIG. 6 below across all asymmetric energy storage cells (155). This method contributes to the increase in accumulation of electric flux density per unit area, as well as retention over time of the electrostatic energy stored within each asymmetric energy storage cell (155) as described in FIG. 1 above and FIG. 6 below.

Figure 6:
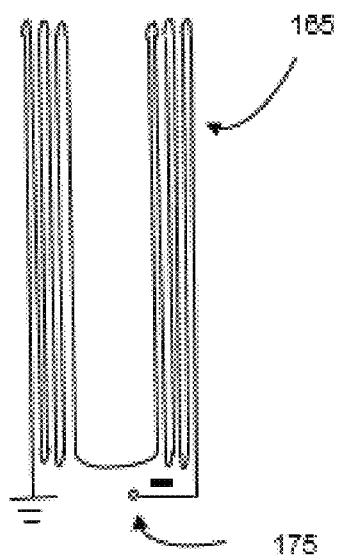
FIG. 6—Includes one embodiment of an Electromagnetic Coil depicting a paired Helmholtz coil.

FIG. 6 provides a depiction of one of many paired Helmholtz coil (165) configurations used in establishing a magnetic field surrounding the asymmetric energy storage cells described in FIG. 5 above, as well as across the overall EESS energy storage reservoir. An electrical current tapped from within the EESS energy storage reservoir is provided at the Helmholtz Coil Input (175). The magnetic field energy created from electric current flowing through the double windings of the paired Helmholtz Coil (165) is distributed throughout the EESS energy storage reservoir. Multiple locations of paired Helmholtz Coils (165) disburse the magnetic energy throughout the paramagnetic material (145) identified in FIG. 5. A more detailed description of this magnetic field distribution is described in the discussion on FIG. 10 below.

Figure 7:
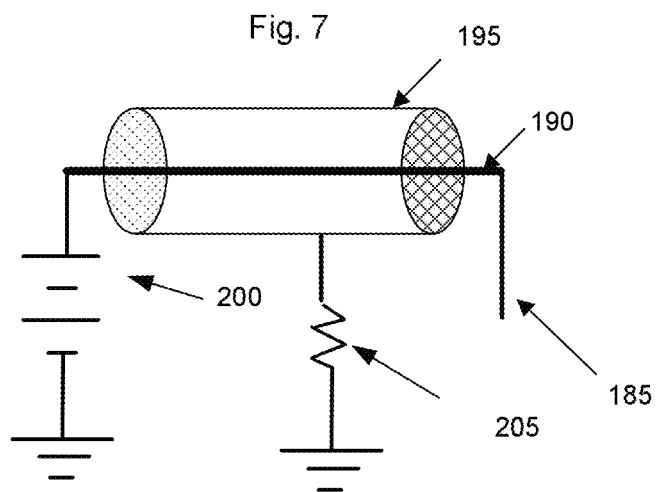
FIG. 7—Includes one embodiment of a Heated Filament/Cathode.

In FIG. 7 a heated cathode configuration is depicted as one method of extracting energy from the energy input from the EESS Storage Reservoirs (185). This input connection is attached to the outer conductor of the conductive current cable, as described in FIG. 2 above. A current is drawn through a heated filament (190), performing as a cathode that is connected to the positive terminal of a battery (200). Free electrons exiting from the heated filament (190) are attracted to the plate (195) acting as an anode using traditional vacuum tube energy extraction processes. The energy residing on the plate (195) is extracted from the EESS and presented to an external load (205) using traditional voltage down conversion methods.

Figure 8:
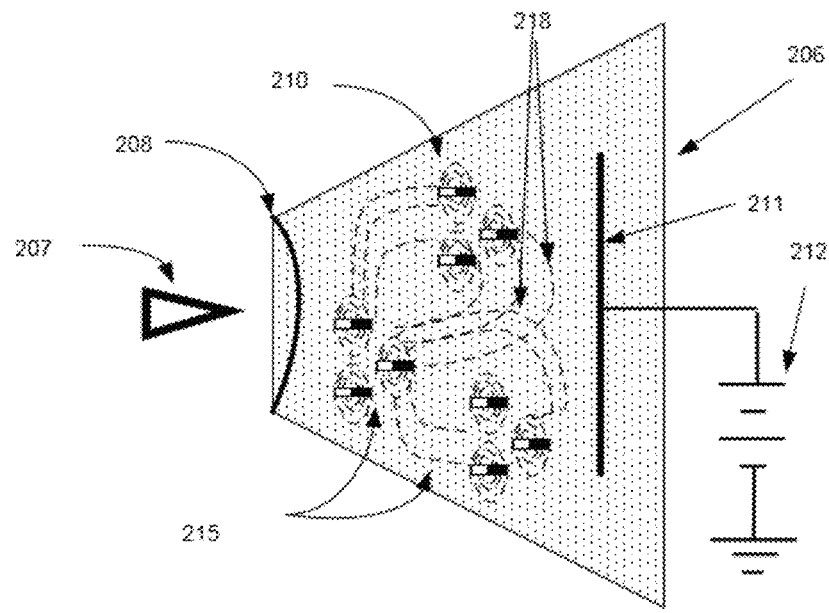
FIG. 8—Includes one embodiment depicting electric flux fields established between disassociated charged pairs residing within an asymmetric energy storage cell.

FIG. 8 provides a representation of the EESS internal electret polarization method maintaining electric fields residing within an asymmetric energy storage cell (206) created using thermal poling techniques. The dipole groups (210) depict the alignment and groupings of dipole pairs created during the initial formation of the electret resulting from the thermal electret poling process. Energetic charged particles are emitted from a charge point cell (207) moving at high speed strike the bremsstrahlung charge plate (208). Energetic bremsstrahlung photons that are emitted from the opposite side of the bremsstrahlung charge plate (208) flow through the asymmetric energy storage cell (210) towards the conductive terminal (211) plate connected to the positive terminal of the battery (212). As the energetic bremsstrahlung photons flow through the asymmetric energy storage cell (206) energy from the electric flux fields (218) of the photons flow into the lower energy level electric fields of the dipole groups (210) and dissociated charged pairs (215). Energy levels of the electric flux fields (218) are directly correlated to the energy received from the electric fields surrounding energetic bremsstrahlung photons traveling from the bremsstrahlung charge plate (208). The effective distance established between the dissociated charged pairs (215) and the polarized alignment of the dipole groups (210) when the thermal electret was formed were determined by the levels of electric field energy surrounding the energetic bremsstrahlung photons as they travel towards the positively charged conductive terminal (211) located within the broader area of the electret material residing within asymmetric energy storage cell (206). The separation distance between dissociated charged pairs (215) and the polarized alignment of the dipole groups (210) are locked into the dielectric material structure as it becomes more rigid during the reduction of heat applied during electret formulation process. During this phase of the electret formulation process the bombardment of energetic bremsstrahlung photons into the dielectric material continues until the electret formulation is complete. Portions of the energy from this ongoing energetic bremsstrahlung photon bombardment maintain high electric field levels within the asymmetric energy storage cell (206). These high electric fields exist between the bremsstrahlung charge plate (208) and the positive conductive ground terminal (211) throughout the electret poling processes occurring within each asymmetric energy storage cell (206). The bremsstrahlung poling process used in creating crystal electrets (not shown) follows a similar process as described above.

Once the fully formed electret based asymmetric energy storage cells (206) are placed inside EESS energy storage reservoirs (10), depicted in FIG. 1, they are ready to accept energetic bremsstrahlung photons occurring within the EESS energy storage process. During the EESS energy storage reservoir charging process, voltages in the kilovolt range are used in generating fast moving energetic charged particles provided from the tip of each charge point cell (207) that are in turn driven into the bremsstrahlung charge plate (208). A decrease in the wavelength of the energetic bremsstrahlung photons occurs as they exit into the electret material of the asymmetric energy storage cell (206). This event occurs as part of the energetic electron conversion to energetic bremsstrahlung photon process performed within the bremsstrahlung charge plate (208). This reduction in the wavelength of the energetic bremsstrahlung photons exiting into the electret material of the asymmetric energy storage cell (206) increases the voltage levels ranging from Kilovolts (KV) to Megavolts (MV) of the energetic bremsstrahlung photons. This effect occurs as described by the Plank and de Broglie equations. As energy is absorbed into the internal electric flux field provided from the electric field of the energetic bremsstrahlung photons of each EESS electret energy storage cell, it is distributed into polarized dipole pairs and into each disassociated charge pair dipole group. The power density per unit area stored within the electric flux fields (218) residing between the polarized dipole pairs and disassociated charged pairs (215) is increased by the square of the voltage from the energetic bremsstrahlung photons based on the power density equation ($E=\frac{1}{2} CV^2$).

FIG. 9 provides depictions of the poling and subsequent assembly process for a wedge based three component asymmetric energy storage cell. The primary limitation on the number of component wedges to be assembled into one asymmetric energy storage cell is based on the maximum distance an energetic bremsstrahlung photon can travel within a fully assembled cell. The distance travelled will primarily be a function of the type and structure of the electret material, stored energy levels residing within the cell, and the initial energy level of the energetic bremsstrahlung photon when it is fired into the cell.

Figure 9A:
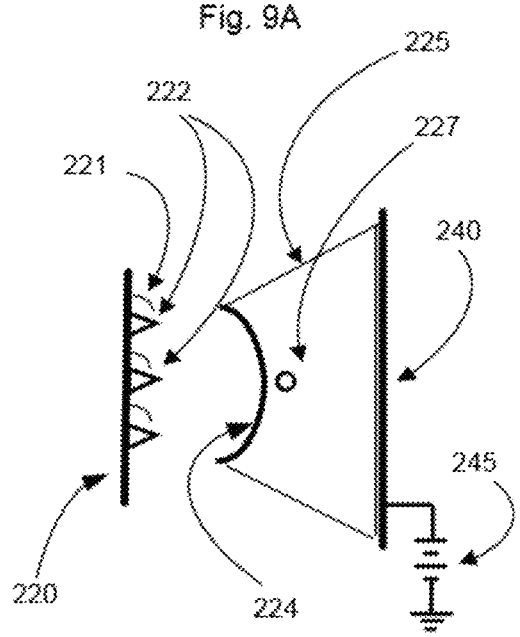
FIG. 9A—Includes an embodiment depicting the components residing within the first of three asymmetric wedges comprising an asymmetric energy storage cell.
Figure 9B:
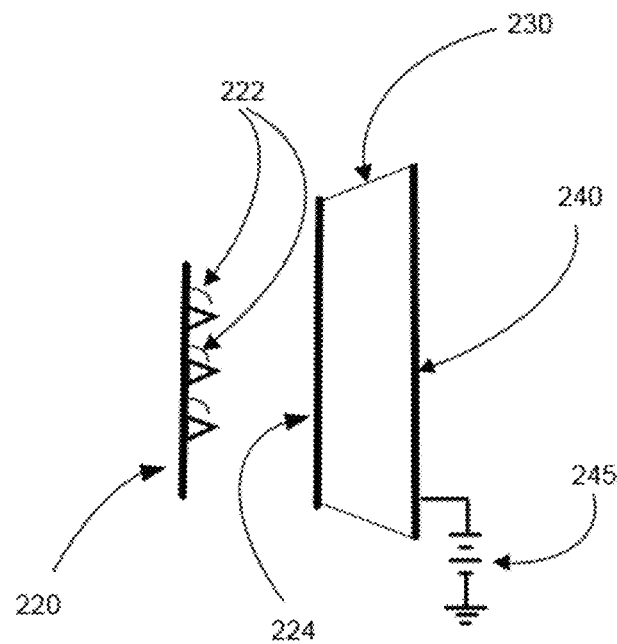
FIG. 9B—Includes and embodiment depicting the components residing within the second of three asymmetric wedges comprising an asymmetric energy storage cell.
Figure 9C:
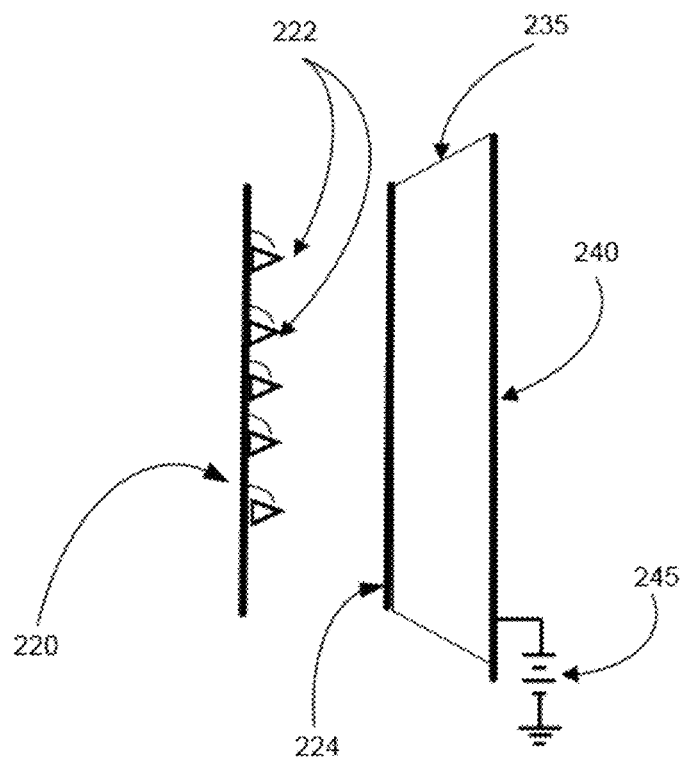
FIG. 9C—Includes and embodiment depicting the components residing within the third of three asymmetric wedges comprising an asymmetric energy storage cell.

FIGS. 9A, 9B and 9C depict the thermoelectric poling configuration of three different size asymmetric wedges. A high voltage is supplied to the energetic electron charge plate (220) that in turn flows through a charging wire (221) of each charge point cell (222) that sprays a brush or corona discharge onto the tip of the charge point cell (222). The subsequent step of this poling action releases fast moving energetic charged particles being formed and driven from the tip of the charge point cell (222) into the bremsstrahlung charging plate (224) mounted on the apex of the first asymmetric wedge (225). Energetic bremsstrahlung photons are fired into the electret material of the asymmetric wedge (225). As these energetic bremsstrahlung photons move through the electret material past the cable housing (227) and towards the conductive ground terminal (240) they distribute energy from the electric fields of the energetic bremsstrahlung photons into dipole groups (210) and disassociated charged pairs (215) as they are being formed. The positive charge distributed on the conductive ground terminal (240) from the battery (245) contributes to the energetic bremsstrahlung photons traveling throughout the entire depth of an asymmetric wedge. Dipole group (210) alignments and disassociated charged pair (215) spacing described in the discussion on FIG. 8 above become locked into electret structure during the traditional cooling down phase of the thermoelectret poling process.

FIG. 9D depicts the assembly process of the different sizes of asymmetric wedges (225), (230), and (235) using conductive mesh screens (250), and the cable housing (227).

Figure 10:
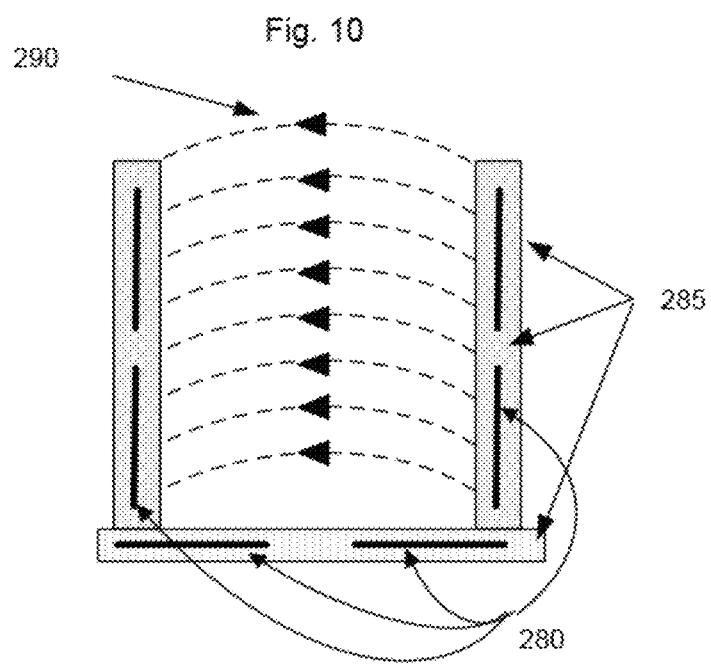
FIG. 10—Magnetic/Paramagnetic Field View

The fully completed asymmetric energy storage cell (255) assembly, is depicted in FIG. 9E. Establishment of the magnetic fields used to extend EESS energy storage times is depicted in FIG. 10. Multiple paired Helmholtz Coils (280) are embedded within the paramagnetic material (285). The magnetic field generated as voltage flows through the multiple Paired Helmholtz Coils (280), is distributed throughout the paramagnetic material (285) within the EESS energy storage reservoir. The magnetic field establishes magnetic field flux lines (290) surrounding the asymmetric energy storage cells with energy restraining the release of free electrons over time. This is one of several EESS methods contributing towards extending the energy storage of the EESS over time by minimizing the leakage of stored electrostatic energy per unit of time.

Operation of Invention

The preferred embodiment of the EESS apparatus is to provide a source of energy storage for renewable energy technologies using a novel combination of power and energy storage densities that have not previously been achieved in traditional capacitor or power cell/battery system solutions. A long term energy storage capability is provided through the unique combination of electret formulation, asymmetric energy cell shapes, magnetic field containment using paramagnetic materials, and performing closed loop control of environmental variables. When the EESS us integrated within conventional constant voltage sources such as batteries, the EESS solution provides a viable solution for significantly expanding the use of renewable energy storage within industries such as utilities and electric vehicles.

The charge process of the EESS begins with a supply of energy, such as wind or solar, input at the voltage charge point (60) in FIG. 1 flowing onto the charge tube (35). At sufficient input voltage levels, a brush or corona discharge is emitted from the tip of the conductor (138) in FIG. 4 onto the tip of the charge point cell (130). A close up depiction of the conductor (138) shown in FIG. 4. depicts that it is electrically connected to the charge tube (135).

In FIG. 3. energetic charged particles (125) are shown being fired from the tips of the charge point cells (115) towards the inside surface of the bremsstrahlung charge tube (110). This tube is mounted on the front end of the asymmetric energy storage cells (97). One of the bremsstrahlung charge tubes (110) functions is to process and eject energetic bremsstrahlung photons into the electret material of each asymmetric energy storage cell (97).

FIG. 8 depicts a close up view of the charge point cell from which the energetic charged particles created as described in FIG. 3 are fired into the bremsstrahlung charge plate (208). Electric flux fields (218) receive and store energy from the higher energy levels provided from the electric fields of the energetic bremsstrahlung photons as they exit from the back of the bremsstrahlung charge plate (208) and flow into the electret media of the asymmetric energy storage cell (206). The energetic bremsstrahlung photon electric field energy is dispersed throughout each asymmetric energy storage cell (206) as the negative potential of these photons are attracted towards the conductive terminal (211) attached to the positive terminal of the battery (212).

As energetic bremsstrahlung photons flow through each asymmetric energy storage cell (206), the higher energy electric field levels from these photons are dispersed into the lower energy electric flux fields (218) established between the aligned dipole groups (210) and disassociated charged pairs (215) of dipole groups (210). These electric flux fields have been previously established between the fixed positions of the aligned dipole groups (210) and disassociated charged pairs (215) in the electret creation process for plastic materials possessing known electret capabilities.

With respect to crystal based electrets, electric flux fields (218) have previously formed through the occurrence of multiple small spherulite formations and/or dense micro crystalline structures in a similar poling process applied during crystal growing processes. FIG. 10. Provides a depiction of a magnetic field contribution to the retention of stored energy within the EESS storage reservoir over time. This retention contribution is included within additional energy retention methods inherent to electret materials. The establishment of a magnetic field depicted through the magnetic field flux lines (290) shown in FIG. 10, is combined with placing the contents of the energy storage reservoir (10) in FIG. 1 under low pressure through the vacuum discharge port (53) also depicted in FIG. 1. The magnetic field is generated through voltage supplied from the EESS storage reservoir into the electromagnetic coil (280) shown in FIG. 10. The energy of this magnetic field is dispersed throughout the paramagnetic material (285) surrounding the asymmetric energy storage cells residing within the EESS energy reservoir.

The energy from the magnetic flux lines (290) contributes to increasing the electric flux density per unit area within each asymmetric energy storage cell within the EESS. Over time, the energy from the magnetic flux lines (290), combined with temperature and humidity sensor/measurement controls, inhibits the dissipation of the energy residing within the electric flux fields (218) depicted in FIG. 8 residing within the electret material of each asymmetric energy storage cell.

The inclusion of a vacuum within the energy storage reservoir (10) depicted in FIG. 1.contributes two solutions within the EESS energy storage retention over time solution. The first contribution of introducing a vacuum within the energy storage reservoir (10) is to raise the energy barrier for free electrons attempting to exit the EESS energy storage reservoir from the electret storage material.

The second contribution of a vacuum being present within the EESS energy storage reservoir is that it increases the dielectric constant values of the dielectric materials residing within the EESS storage reservoir (10). Each decrement of the vacuum pressure introduced into the EESS storage reservoir (10) corresponds to an increase in the dielectric strength of the dielectric materials reservoir.

There are a range of methods available in the art for extracting high voltage energy from the EESS to be provided to external loads. One method is using a heated cathode method as depicted in FIG. 7. High voltage energy is drawn from the EESS storage reservoir (185) through a heated filament (190) acting as a cathode. The opposite end of the heated filament (190) is attached to the positive terminal of a battery (200). As free electrons are emitted from the heated filament (190), additional electrons are attracted from the EESS storage reservoir (185) along the conductive wire of the heated filament (190) from the positive potential of the battery (200). The free electrons emitted from the heated filament (190) are collected by the plate (195), acting as an anode, where energy is withdrawn from the plate (195) to external loads using traditional high voltage down conversion methods.

The method of extracting an electrical current from the energy extraction points (55) shown in FIG. 1 is a conversion of the high voltage charge densities residing within the electric flux fields (218) depicted in FIG. 8 satisfying external load demands. The energy from the charge densities residing within the electric flux fields (218) in FIG. 8 permeates the outer conductive current cable (50) depicted in FIG. 1 where these electric flux fields are attracted to the inner conductor of the conductive current cable (50). This method allows portions of the electric flux fields to be concentrated onto the outer conductive shield of the conductive current cable (50) in FIG. 1 at extremely high voltages ranging from the KV to MV range. A conductive current is established on the outer conductor of the conductive current cable (50) in FIG. 1 when an external load is engaged. As free electrons are emitted from the heated filament (190) depicted in FIG. 7, a conductive current flows towards the positive potential established by the battery (200). The energy for this conductive current is extracted from the energy residing on the outer conductor of the conductive current cable (50) in FIG. 1.

Alternative Embodiments—

An alternative embodiment of the EESS apparatus applies a sequence of low pressure during the EESS charging phase that changes to high pressure during extended time frames of EESS storage reservoir energy storage retention. This methodology incorporates the characteristic of increases in dielectric strength in the electret material contributing to increasing electric field strengths during the EESS charging phase, while taking advantage of the retention of energy over time in electrets at high pressures as defined by the Paschen curve.

An additional alternative embodiment is using a method for rapidly transferring energy from a larger higher voltage stationary EESS storage reservoir to a mobile lower voltage EESS storage reservoir. This method takes advantage of the EESS being integrated in parallel with a traditional battery installed within a mobile electric vehicle. The result of applying this alternative embodiment significantly increases the transfer rate of energy storage between the two EESS reservoirs. This energy transfer rate directly between the two EESS modules occurs at a much faster rate per unit of time than transferring energy directly to a battery using traditional energy transfer methods.

The outer perforated shield of the conductive current cable can be coated with a 3D matrix of carbon, carbon graphene or other combinations to increase the surface collection area the electric flux field energy conversion to conductive current process. This alternative method increases the immediate availability of high rise time voltage responses from the EESS reservoir.

Additional alternative embodiments include integrating external control and monitoring functions with the internal EESS automated control and monitoring functions described above. The scope of the external control and monitoring integrations facilitating smart grid solutions by interfacing capabilities including external battery conditioning, electric vehicle, electrical transmission lines, power generation, aggregated distribution management and synchrophasor based power management unit systems.

CONCLUSION, RAMIFICATIONS, AND SCOPE

Thus, the reader will see that the synergistic combination of the EESS innovative apparatus elements, methods, and sequence of steps provides a long term high power and high energy density/unit area energy storage solution. The EESS long term energy storage solution is targeted to be integrated with current short term renewable energy voltage source storage solutions in providing a power distribution solution in a manner that has not previously been described in its entirety within the prior art.

Although the description above contains many specificities, these should not be construed as limiting the scope of the invention, but as merely providing illustrations of some of the presently preferred embodiments of this invention. For example, the asymmetric energy storage cell, as well as the energy storage reservoir, can have many types of different configurations. Another example is that many different types and combination of elements from the periodic table can be used in growing crystal based asymmetric energy storage cells.

Thus the scope of the invention should be determined by the appended claims and their legal equivalents, rather than by the examples given.

What is claimed is:

1. Provide power to external loads for extracting energy from a higher level energy source located within an energy storage reservoir where said higher level energy source receives energy by extracting energy from bremsstrahlung photon energy fields traversing through energy storage cells located within said energy storage reservoir, said energy storage reservoir apparatus performing an energy capture and storage retention process over time to store high capacities of power and energy density for providing power to said external loads having a process comprising;
 (a) creation of a high voltage at sufficient energy levels to project a corona or brush discharge from the tip of a conductor towards a first vertex of a charge point cell having asymmetric polyhedron shaped electret or piezoelectric characteristics,
 (b) said charge point cell having a short-term energy capture and fast voltage rise time release capability forming a plurality of energetic charged particles projected from said first vertex of said charge point cell creating a plurality of fast moving energetic charged particles moving in a vacuum towards an asymmetric energy storage cell,
 (c) a plurality of asymmetric energy storage cells having an asymmetric polyhedron shape containing dielectric material possessing dielectric characteristics, having electret or piezoelectric characteristics, having a plurality of polarized electric dipoles or disassociated dipole pairs, and having a second vertex for capturing and absorbing energy from said energetic charged particles,
 (d) said plurality of said asymmetric energy storage cells, each having a bremsstrahlung charging plate mounted on said second vertex to receive and transform said plurality of fast moving energetic charged particles into a plurality of energetic bremsstrahlung photons,
 (e) said plurality of asymmetric energy storage cells residing within said energy storage reservoir apparatus providing an energy capture capability within said energy storage cells by receiving and storing energy from the first electric fields of said plurality of energetic bremsstrahlung photons as they traverse through said energy storage cells,
 (f) said plurality of energetic bremsstrahlung photons having sufficient velocity to be projected from said bremsstrahlung charging plate into the full depth of each said asymmetric energy storage cell residing within said energy storage reservoir apparatus,
 (g) said plurality of energetic bremsstrahlung photons possessing said first electric field for transferring higher levels of energy into a plurality of lower energy electric displacement fields residing between said plurality of electric dipoles and a plurality of disassociated charged pair groups residing within each of the plurality of said asymmetric energy storage cells, (h) said plurality of lower energy electric displacement fields capturing energy from said first electric fields of said plurality of energetic bremsstrahlung photons and a said plurality of lower energy electric displacement fields performing energy retention as energy is absorbed from said first electric fields of said plurality of energetic bremsstrahlung photons as said plurality of energetic bremsstrahlung photons traverse near or through said plurality of lower energy electric displacement fields residing within said energy storage cells, (i) said energy storage cells performing said energy retention over time having an energy decay time constant allowing said energy storage reservoir to maintain said energy retention for hours, days or multiple weeks, (j) said energy storage reservoir containing paramagnetic material having a means to maintain a magnetic field by receiving energy from said plurality of lower energy electric displacement fields, said paramagnetic material surrounding a plurality of asymmetric shaped crystal electrets embedded within an electret based dielectric material surrounding said plurality of asymmetric energy storage cells where the energy of a second electric field residing at an apex of each said asymmetric shaped electret crystal facing each said asymmetric energy storage cell is of sufficient magnitude to impede the movement of electrons away from each said asymmetric energy storage cell, (k) a first closed loop monitoring and control subcomponent of said energy storage reservoir apparatus balancing vacuum pressure, magnetic field strength, temperature, humidity, and/or energy flows from within said plurality of asymmetric energy storage cells by performing process control functions to maintain the retention of energy over time within said asymmetric energy storage cells, said energy storage reservoir apparatus, and/or satisfying external power load demands, (l) extraction of energy from said energy storage reservoir apparatus through an outer perforated conductive current cable surrounding an inner conductive cable connected to an external voltage source positioned within said plurality of lower energy electric displacement fields residing within a portion of each said asymmetric energy storage cell allowing energy from said portion of said plurality of lower energy electric displacement fields to flow into said outer perforated conductive cable, (m) said outer perforated conductive current cable connected directly or indirectly to said external load performing a high voltage to low voltage conversion, or connected indirectly to a constant voltage power source of energy to said external load, (n) a second closed loop monitoring and control method performing monitoring, sensing, measurement and/or control of energy flowing out of said energy storage reservoir apparatus through said outer perforated conductive current cable in response to external load voltage, current, frequency and/or phase synchronization demands being placed on said energy storage reservoir apparatus.

2. Elements of claim 1 wherein the velocity of said plurality of fast moving energetic charged particles projected through said gas or gas mixture maintained within said vacuum is increased as they travel towards said bremsstrahlung charging plate.

3. Elements of claim 1 wherein said dielectric material residing within said electret based dielectric material, each said asymmetric shaped energy storage cell and each said asymmetric shaped electret crystal is comprised of high levels of permittivity, dielectric constant, dissipation factor, polarization, conductivity at bremsstrahlung photon frequencies, and low rates of dipolar relaxation over time, thereby enhancing said energy storage retention over time.

4. Elements of claim 1 wherein said plurality of lower energy electric displacement fields are maintained over time by minimizing the rate of depolarization of said plurality of polarized electric dipoles and/or the decrease in separation of said disassociated dipole pairs based on said electret based dielectric material, said vacuum pressure, said magnetic field strength, said temperature, and/or said humidity.

5. Elements of claim 1 wherein said magnetic fields are distributed within said paramagnetic material encapsulating said asymmetric shaped energy storage cells residing within said energy storage reservoir apparatus.

6. Elements of claim 1 wherein said inner conductive cable maintains a connection point for said lower energy electric displacement fields.

7. Elements of claim 1 wherein said first closed loop control monitoring and control subcomponent performs a closed loop control process providing an integrated manipulation of said vacuum pressure, said magnetic field strength, said humidity, and/or said temperature to reduce the decay of space charges residing within said second electric fields established between said plurality of polarized electric dipoles and/or said disassociated dipole pairs thereby extending energy storage time of said energy storage reservoir apparatus.

8. Elements of claim 1 wherein functions of said second closed loop monitoring and control method of said energy storage reservoir apparatus performing a release of energy to external loads either indirectly through constant voltage sources such as batteries, or directly to electric vehicles, electrical transmission lines, power generation management systems, aggregated distributed management system requirements or other load devices providing said external load voltage, current, frequency and/or phase synchronization demands on energy utility power grids.

9. Elements of any one of claims 1, claim 3, claim 5, or claim 7 wherein said first closed loop monitoring and control subcomponent performs processes to increase the dielectric constant of said dielectric material to extend the storage of energy over time within the said second electric fields of said asymmetric shaped energy storage cells.

10. Elements of claim 1 wherein each said retained asymmetric shaped energy storage cell or each said asymmetric shaped electret crystal having an asymmetric polyhedron shape possessing three or more vertices.

11. Elements of claim 1 wherein said energy storage reservoir apparatus is comprised of one or more said asymmetric shaped energy storage cells.

12. Elements of any one of claims 1, or claim 6 wherein said inner conductive cable and said outer perforated conductive current cable are separated by a dielectric material allowing said outer perforated cable to be positioned within a portion of said plurality of lower energy electric displacement fields.

13. Elements of any one of claims 1, 6 or claim 12 wherein said extraction of energy from any portion of said plurality of lower energy electric displacement fields is performed through said outer perforated conductor.

14. Elements of any one of claims 1 or claim 13 wherein energy residing within said plurality of lower energy electric displacement fields residing within each said asymmetric shaped energy storage cells, residing within said energy storage reservoir apparatus flows through portions of said lower energy electric displacement fields into said outer perforated conductor thereby reducing the amount of energy stored within said energy storage reservoir apparatus.

15. An asymmetric polyhedron shaped electret energy storage cell manufacturing process providing an internal electric field energy storage capability to be created within dielectric materials when said asymmetric polyhedron shaped electret energy storage cell manufacturing process is completed comprising,
   a. a creation of a plurality of energetic bremsstrahlung photons from a plurality of fast moving energetic charged particles bombarding an interface plate where said interface plate having a means to create a plate electric field when said interface plate is struck by said fast moving energetic charged particles,
   b. said dielectric materials possessing electret or piezoelectric characteristics residing within or between a plurality of mineral, organic, or inorganic voids, crystals or facets,
   c. creation of heating and cooling phases at different times within said asymmetric polyhedron shaped electret energy storage cell manufacturing process to be applied when said dielectric material is formed into an asymmetric wedge shape,
   d. projection of said plurality of energetic bremsstrahlung photons into said dielectric material during said heating phase where said internal electric fields create a plurality of polarized electric dipoles and/or disassociated charged pair groups within said dielectric material,
   e. position of said plurality of polarized electric dipoles and/or said disassociated charged pairs within said dielectric material to be maintained during the time that said cooling phase is applied to said dielectric material thereby maintaining separation of said plurality of polarized electric dipoles and/or disassociated dipole pairs within said asymmetric wedge shape,
   f. a plurality of interconnected electric displacement fields are established between said plurality of polarized electric dipoles and/or disassociated dipole pairs residing within said asymmetric wedge shape from said plurality of energetic bremsstrahlung photons,
   g. during-the assembly of the plurality of said asymmetric wedge shapes, conductive or nonconductive bonds are established between each said wedge shape in creating said asymmetric polyhedron shaped electret energy storage cells,
   h. an equalizing of energy levels occurs through said conductive or nonconductive bonds across all said plurality of interconnected electric displacement fields, residing within each said asymmetric polyhedron shaped electret energy storage cell.

16. Elements of claim 15 wherein said dielectric material is comprised of high levels of permittivity, dielectric constant, dissipation factor, polarization, and/or conductivity at bremsstrahlung photon frequencies, allowing low rates of dipolar relaxation to occur over time.

17. Elements of claim 15 wherein said interface plate has a material thickness and a material composition that when struck by said plurality of fast moving energetic charged particles results in the creation of said plurality of energetic bremsstrahlung photons being projected into said dielectric material.

18. Elements of claim 15 wherein said dielectric material allowing said plurality of mineral, organic, or inorganic voids, crystals, or facets to be created, each having piezoelectric or electret characteristics being enhanced during the time when said cooling phase is applied to said dielectric material as each said asymmetric wedge shape is created within said asymmetric polyhedron shaped electret energy storage cell manufacturing process.

* * * * *